United States Patent

Medendorp

[15] 3,687,594
[45] Aug. 29, 1972

[54] APPARATUS FOR FORMING A PLASTIC SHEET

[72] Inventor: Roger L. Medendorp, Grand Rapids, Mich.

[73] Assignee: Kirkhof Manufacturing Corporation, Grand Rapids, Mich.

[22] Filed: Sept. 21, 1970

[21] Appl. No.: 74,082

[52] U.S. Cl. ...................425/388, 264/92, 264/93, 264/327
[51] Int. Cl. ............................................B29c 17/04
[58] Field of Search ........264/89, 90, 92, 93, 94, 327; 425/384, 388, 387

[56] References Cited

UNITED STATES PATENTS

| | | | |
|---|---|---|---|
| 3,159,695 | 12/1964 | Behringer | 264/92 X |
| 3,484,518 | 12/1969 | Ignell | 264/327 X |
| 2,702,411 | 2/1955 | Winstead | 264/92 X |

FOREIGN PATENTS OR APPLICATIONS

| | | | |
|---|---|---|---|
| 200,129 | 11/1955 | Australia | 18/19 F |

*Primary Examiner*—Robert F. White
*Assistant Examiner*—Jan H. Silbaugh
*Attorney*—Price, Heneveld, Huizenga & Cooper

[57] ABSTRACT

An apparatus for forming a plastic sheet by differentially heating certain portions of the sheet of plastic previous to the differential pressure forming operation whereby as the plastic sheet is being formed the flow of plastic in the sheet is controlled. The plastic sheet is placed on a heating surface and a die is placed over the sheet. Heat is applied to the plastic sheet at certain predetermined portions thereof and after being heated to a desired state, a pressure differential is applied to the plastic sheet. As the differential pressure is applied to the sheet the portions which are at a greater degree of temperature flow and stretch more easily and thus the gauge or thickness of predetermined portions of the article being formed can be controlled.

6 Claims, 4 Drawing Figures

PATENTED AUG 29 1972

INVENTOR
ROGER L. MEDENDORP

BY

ATTORNEYS

INVENTOR
ROGER L. MEDENDORP

BY Price, Heneveld, Huizenga
& Cooper

ATTORNEYS

APPARATUS FOR FORMING A PLASTIC SHEET

BACKGROUND OF THE INVENTION

In pressure differential forming of a sheet of plastic, the common practice is to place the sheet on a heated plate and a die having a configuration corresponding to that desired for the ultimate product is placed over the sheet by many different ways such as a press. A differential pressure is then applied to the sheet by either creating a vacuum on the die side of the sheet or a pressure on the side opposite the die to force the plastic sheet into the die to that it will conform to its shape.

One of the problems which is frequently encountered in such differential pressure forming operations, is that it is extremely difficult, if not impossible, to control the flow of plastic in the sheet as it is formed. Thus, it is extremely difficult to control the gauge or thickness of the walls of the article being formed by the sheet. Such control of the thickness at predetermined positions of the article are very desirable particularly for reasons of providing strength at certain areas of the article such as in the bottom of a deep container. Thus, this problem of controlling the flow of plastic in the sheet and the resultant thickness of the wall of the article is particularly significant where deep containers are to be formed. In the forming of such containers, the plastic sheet is heated and after being softened to a desired state it is expanded upwardly into the die by means of the pressure differential imposed thereon. In order to expand upwardly, the sheet must stretch. This results in a formed product having considerably less thickness in the more greatly stretched areas. However, once the plastic contacts the inside of the die, no further stretching occurs. Thus, deep draw containers are formed which have extremely thin and flimsy bottoms which have relatively thick upper sides. The corners of the containers become particularly thin and rupture during forming is not uncommon.

BRIEF SUMMARY OF THE INVENTION

The present invention provides an apparatus for pressure differentially forming articles in such a manner that the thickness of the walls of the articles being formed, such as in a deep container, can be controlled. This is accomplished by differentially heating the sheet of plastic prior to forming such that selected portions thereof are heated to a greater extent than others. Thus, when the differential pressure is applied to the sheet the stretching of the sheet can be controlled and as a result the thickness of all portions of the article can also be controlled.

The differential heating can be accomplished by many different ways but preferably baffle plates having sections which conduct heat at different rates are provided so as to control the degree of heat at the predetermined portions of the heated platen on which the sheet is placed. Accordingly, those portions of a plastic sheet which must stretch furthest into the die are heated less than those portions which do not have to stretch as far. The most heated portions will tend to stretch sooner than the less heated portions. Consequently, deep draw containers and other articles of this nature can be formed having bottoms and corners which are thicker than would be the case if the container were formed by conventional pressure differential forming means.

Therefore, the object of this invention is to provide an apparatus for pressure differentially forming sheets of plastic material in such a way that the stretching of the material at different areas or portions of the article can be controlled.

Another object of this invention is to control the stretching of the plastic sheet by differentially heating the sheet of plastic prior to forming.

These and other objects of my invention will become obvious upon a reading of the following specification made in conjunction with the accompanying drawings.

PREFERRED EMBODIMENT

Figure 2:
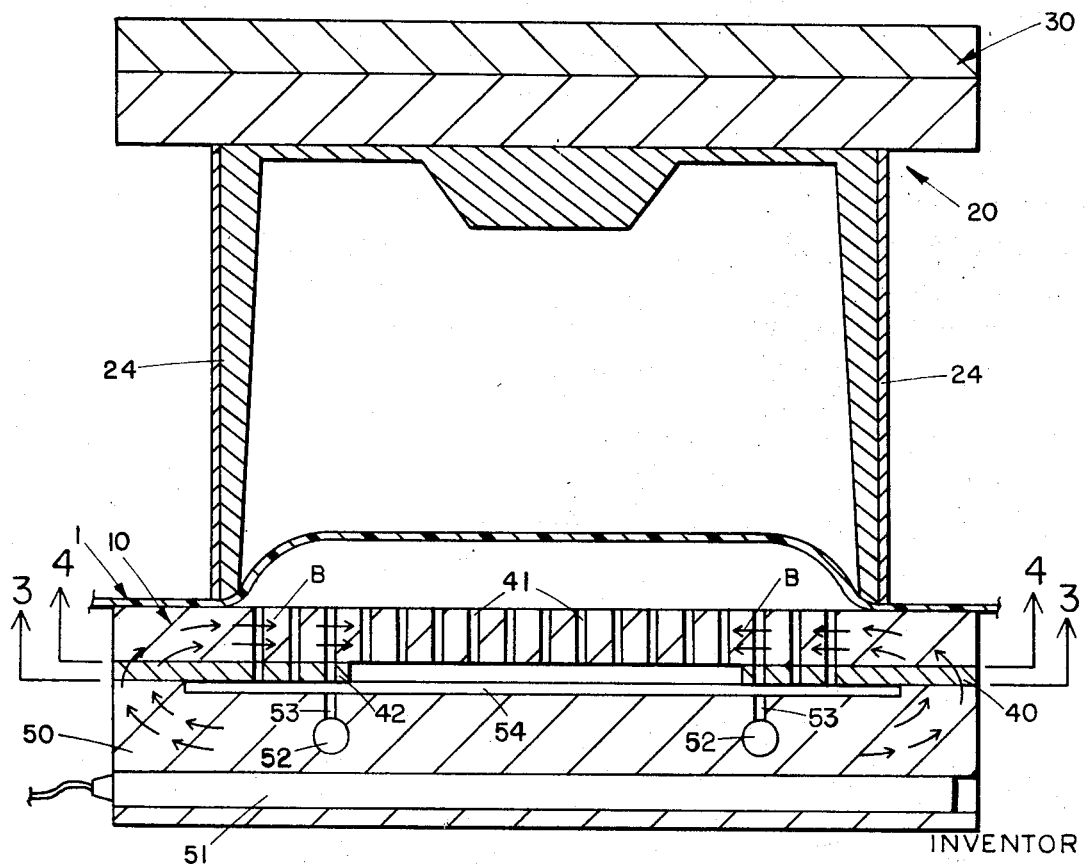
FIG. 2 is a cross-section of apparatus for forming plastic articles in accordance with this invention.
Figure 3:
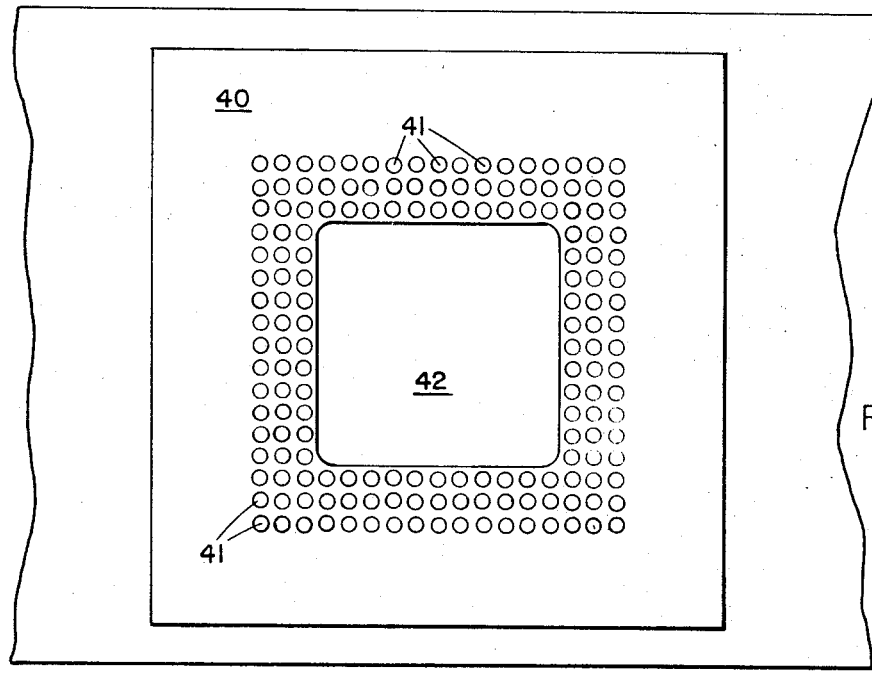
FIG. 3 is a cross-sectional view taken along the plane 3—3 of FIG. 2 and showing the baffle plate utilized in this invention to control the degree of heat on the heating plate.
Figure 4:
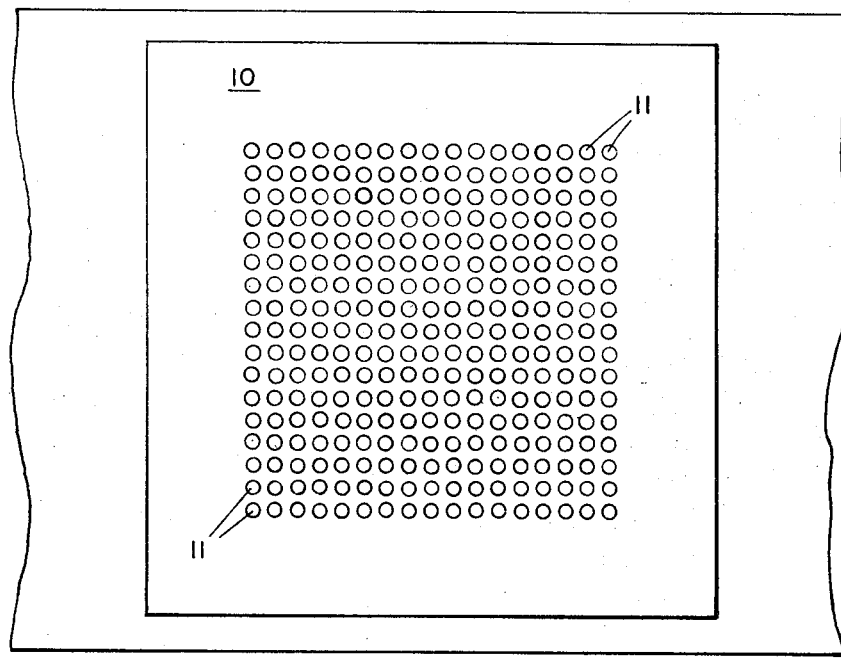
FIG. 4 is a cross-sectional view taken along the plane 4—4 of FIG. 2 and showing the heating plate.

The preferred embodiment of this invention is illustrated best by FIG. 2 in conjunction with FIGS. 3 and 4 which show components of the apparatus. In FIG. 2 a heating plate or surface 10 is shown on which a sheet of plastic 1 is placed previous to forming of the same. A female die 20 is provided which is adapted to be placed over the plastic sheet 1 by means of a press 30 to which the female die 20 is attached by any conventional means, it being understood that the die can be changed so that different shapes of articles can be formed corresponding to the shape of the cavity of the die.

Below the heating plate 10 is a means for applying heat to the heating plate, such means including the heating platen 50 having the heater element 51 such platen being utilized in conjunction with a baffle plate 40. Also provided is a means for creating a pressure differential on opposite sides of the sheet 1 which, as will be described in greater detail hereinafter, includes openings 11 in the heating plate 10 and the air passageways 52 and 53 in the platen 50. As will be observed, a flow passageway means 54 is provided in the top portion of the platen 50 to provide a path for the flow of air from the passageways 52 and 53 to the openings 41 and 42 which communicate with the openings or holes 11 in the heating plate 10.

Now referring specifically to each of the components in the apparatus shown in FIG. 2, it will be seen that heating plate 10, sometimes referred to in the art as a pressure plate, is constructed of a heat conducting metal. It includes a plurality of regularly spaced holes 11 extending through its thickness (FIGS. 2 and 4). It should be understood, however, that the particular arrangement of the holes is not significant.

The die 20 has an interior configuration which corresponds to the configuration of the article to be formed, in this case the deep container 4 as disclosed in FIG. 1, and will be described in greater detail hereinafter. In this embodiment is shown the outer side surfaces of die 20 comprised of knife blades 22 having sharp edges to insure that a tight seal is formed between die 20 and the surface of plastic sheet 1. However, any conventional means can be used for providing such a tight seal if one is desired.

Press 30 is a conventional press and needs very little explanation. In fact, the press 30 is schematically illustrated, the details being left out because the details do not form any part of this invention.

Baffle plate 40 is constructed of a heat conducting material specifically for the purpose of conducting the heat from platen 50 to the heating plate 10. This baffle plate 40 is constructed with a large opening 42 in the central portion (FIG. 3) and a plurality of small openings 41 spaced about its periphery in a pattern so as to register with openings 11 in the heating plate 10 as illustrated by FIG. 4. It should be understood that baffle plate 40, within the broadest aspects of this invention, could be integrally formed with the platen 50. The function of the baffle plate is to control the flow path of the heat from the platen 50. This flow of heat is illustrated by the arrows designated by the letter B. Thus the heat flows from the outside of the platen 50 through the baffle 40 and then inwardly toward the center of the heating plate 10. Of course, some heat flows through the air spaces provided by the passageway means 54 of the platen 50 and the opening 42 of the baffle plate 40. But, in any event, it should be clearly evident the greatest amount of heat is flowing on the outer peripheral portions of the heating plate 10. Thus, the temperature at the outer portions is much greater than the temperature at the center. It should be understood that the above construction is only one way of controlling the temperature at specific portions of the heating plate 10. Other means can be provided to accomplish the same.

Heating platen 50 is similarly constructed of a heat conducting metal material and includes a heater element 51. As previously described in accordance with the preferred embodiment, two air passages 52 are provided through heating platen 50. These passages 52 are joined by the vertical passages 53 to the air passageway means 54 which can be grooves or any other means whereby the air can be conducted through the openings 41, 42 and 11 to one side of the sheet 1.

OPERATION

Having described the apparatus of this invention, its operation and the method of this invention should be evident. The first step in operating this apparatus after the proper die 20 has been secured to the press 30 and the press is in upward position with the die spaced above the heating plate 10, is the placing of plastic sheet on the heating plate 10 which is previously or thereafter heated by means of the platen 50, and the press 30 is lowered to locate the die 20 above the sheet, preferably with its edges forming a seal. As previously explained with the construction as shown, the temperature at various portions along the heating plate 10 is different. The greatest intensity of heat is along the periphery of the heating plate and the lowest degree of heat is in the exact center. Thus, the central portion of the plastic sheet is at a different state than the portions near the periphery of the die.

After the plastic sheet 1 has been heated sufficiently, air is fed through the passageways 52, 53 and 54 and thence through the openings 41 and 42 of the baffle plate and to the openings 11 in the heating plate. This establishes a pressure differential between one side of the plastic sheet 1 and the top side thereof, causing the sheet to be forced upwardly. As illustrated in FIG. 2, the portions of the sheet most nearly adjacent the edges of the die stretch to a greater extent than the portions at the center. This is caused by the differential in the heat temperature in those portions of the plastic sheet.

The pressure differential eventually forces the plastic sheet into the entire cavity of the die 20 causing it to conform to the shape of the cavity. When thus finally forced to entirely conform to the inner configuration of die 20, the bottom of the container so formed will be much thicker than the sides. Further, the bottom of the container so formed will be much thicker than would be the case if no differential temperatures were provided along the heated plate 10.

Figure 1:
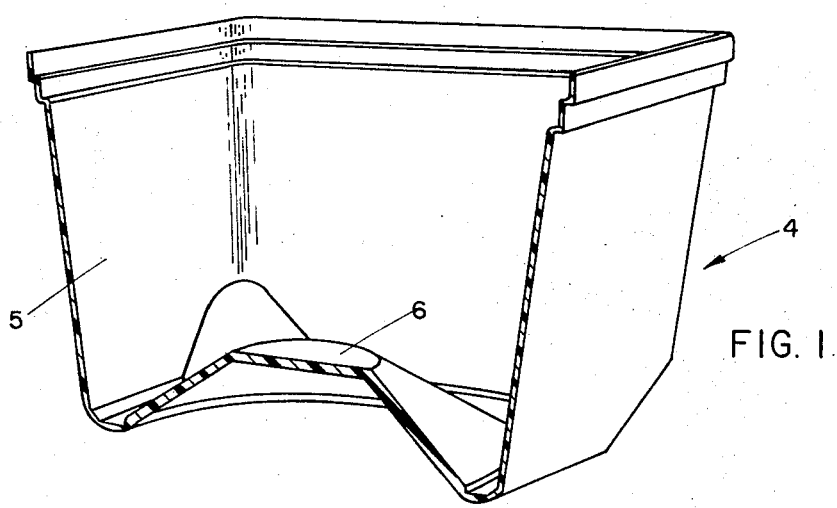
FIG. 1 is a cutaway of a perspective view of a deep draw container which can be formed according to this invention.

FIG. 1 shows a cross-section of the container 4 in which the thickness of the bottom 6 has been somewhat exaggerated in order to illustrate the manner in which thicker bottoms can be achieved by this invention.

It should be understood that although I have disclosed one way of creating this differential heat along the heated plate 10, many other different ways could be devised for producing the same effect. For example, a baffle plate could be used of varying conductive properties so that at desired areas of the heated plate 10 the temperature at some locations will be greater than other by virtue of the lower conductivity of those portions of the baffle adjacent such lower temperature portions.

Therefore, it should be understood that the above described apparatus and method is only one preferred embodiment of this invention and that many changes, modifications and alterations can be made therein without departing from the spirit of this invention. Accordingly, this invention should be limited only as expressly provided by the appended claims.

The embodiments of the invention in which an exclusive property or privilege is claimed are defined as follows.

1. An apparatus for forming plastic articles from a sheet of plastic material comprising: a surface plate on which the sheet of plastic is laid; a heating source for heating said surface plate; a mold above said surface plate, said mold having a cavity; and means for subjecting said sheet of plastic laid on said surface sheet to a differential pressure on opposite sides thereof for causing said sheet of plastic to be deformed into the cavity of said mold, the improvement comprising: a heat conducting means positioned between said heating source and said heating surface plate for conducting heat therebetween; said heat conducting means having means for heating portions of said surface at different temperatures whereby a plastic sheet placed on said heating surface can be heated at different temperatures in different portions thereof; said heat conducting means between said surface plate and said heat source comprising a baffle plate with a plurality of openings extending entirely therethrough from said heat source to said surface plate, said openings being prearranged in size and position to produce the desired differential temperatures in the said different portions of said surface plate.

2. The apparatus of claim 1 in which one of said openings in said baffle plate is centrally located and is relatively large compared to the size of the other of said openings.

3. The apparatus of claim 1 in which a substantial number of said plurality of openings in said baffle plate are aligned with and correspond to the holes in the heating surface plate whereby air can be conducted to the under side of said plastic sheet; one of said openings in said baffle plate being centrally located and relatively large compared to the size of the other of said openings therein.

4. The apparatus of claim 1 in which a substantial number of said plurality of openings in said baffle plate are aligned with and correspond to the holes in the heating surface plate whereby air can be conducted to the under side of said plastic sheet.

5. The apparatus of claim 4 in which the said plurality of openings in said baffle plate which are aligned with and correspond to holes in the heating surface plate are located adjacent the outer periphery of said mold and said large opening is located inwardly thereof whereby the portions of the plastic sheet adjacent the outer periphery of said mold are heated to a higher temperature than said portions located centrally of said mold.

6. The apparatus of claim 5 in which there are no openings in said baffle plate at the marginal edges thereof whereby the heat can flow freely at said marginal edges between the heat source and the surface plate to produce the highest concentration of heat at the marginal edges of the surface plate immediately adjacent the periphery of said mold.

* * * * *